United States Patent

Siana, Jr.

[11] Patent Number: 5,957,399
[45] Date of Patent: Sep. 28, 1999

[54] RETRACTOR FOR CAPTURING WIRE CABLE

[76] Inventor: Joseph Siana, Jr., 3021 S. 124th Ave., Tulsa, Okla. 74129

[21] Appl. No.: 08/998,329

[22] Filed: Dec. 24, 1997

[51] Int. Cl.[6] .............................. B65H 75/40; H02G 3/22
[52] U.S. Cl. ...................... 242/377; 242/379; 242/381.3; 254/134.3 FT; 294/19.1; 119/803
[58] Field of Search .................................. 242/377, 379, 242/381.3; 294/19.1, 119.2; 254/134.3 FT, 134.3 R; 119/796, 802, 803, 804

[56] References Cited

U.S. PATENT DOCUMENTS

| | | |
|---|---|---|
| 869,686 | 10/1907 | Bauno . |
| 2,800,289 | 7/1957 | Stamm ..................................... 242/377 |
| 3,582,044 | 6/1971 | Gardner . |
| 4,092,780 | 6/1978 | Trethewey et al. . |
| 4,659,126 | 4/1987 | Breck et al. . |
| 4,682,716 | 7/1987 | Morellini ................................ 294/19.1 |
| 4,817,643 | 4/1989 | Olson . |
| 5,210,956 | 5/1993 | Knispel et al. . |
| 5,505,432 | 4/1996 | Noonan . |
| 5,624,085 | 4/1997 | Usami . |
| 5,649,674 | 7/1997 | Cielker . |
| 5,699,748 | 12/1997 | Linskey et al. ......................... 294/19.1 |
| 5,810,277 | 9/1998 | Cielker et al. ................. 254/134.3 FT |

*Primary Examiner*—John M. Jillions

[57] ABSTRACT

A retractable wire removal device for capturing wire cable and the like which is being run through walls or other enclosed spaces. The device comprises a flexible "tape" which forms a loop within a wall. Once the wire cable or other material is positioned within the loop, the tape is retracted, thus capturing the wire within it. The device along with the wire is then removed from the wall at the same time.

12 Claims, 3 Drawing Sheets

RETRACTOR FOR CAPTURING WIRE CABLE

BACKGROUND OF THE INVENTION

The present invention is directed toward a device which will assist in the capturing and extraction of wires, cables and the like which are being run through walls or other enclosed spaces. In particular, the present invention is directed toward a retracting device that may quickly and efficiently capture electrical wire, telephone wire, electrical and telecommunication wire and cable from within a wall or other enclosed space by means of a retractable tape.

For the purposes of this application the terms "wire" or "wiring" shall represent electrical wire, telecommunication cable, telecommunication wiring and any other wire, cable and the like which can be run from within a wall or enclosed space. Further, the term "wall" shall represent any form of a wall or other enclosed space.

When an electrical outlet, telephone outlet and the like is needed to be installed, it is common practice to run the necessary wiring within the wall to such a location upon which such outlet is to be placed. Once the wiring has been run within the wall it must be captured and brought out from within the wall so that the necessary hardware can be applied to it.

Because most wiring is flexible, it has difficulty being run within the wall. Devices called "snakes" or "fish tapes" have been developed in which to assist the wire along the path it takes within the wall. See Noonan, U.S. Pat. No. 5,505,432 directed toward an antisnagging device used with "fish tapes". Trethewey, U.S. Pat. No. 4,092,780 directed toward an electrician's "fish tape"; and Gardner, U.S. Pat. No. 3,582,044 directed toward a "fish tape" reel . The above mentioned devices assist wiring through a wall or conduit. Once the wire has reached the desired location, it must be extracted from the wall. Because the above-mentioned devices do not make provision for removing such wiring through a projected opening, the wire has been traditionally removed by hand or by crude hook-type devices.

There is a need for a device which can capture wiring from within a wall or other enclosed space and remove it from the same. This type of device would be more efficient and effective with respect to removing wiring from within a wall.

SUMMARY OF THE INVENTION

The present invention is directed toward a device which retracts wiring from within a wall or other enclosed space. The device includes a coiled flexible tape and a housing. The housing further comprises the guide arm for the tape and a stabilizer. The guide arm is placed within a target opening. The coiled tape is located within the housing. One end of the tape is fixed within the housing. The other end of the tape is fixed to the guide arm in such a manner that when expanded, forms a loop. The tape is able to be extended from within the housing into the interior of the wall or other enclosed space by means of a extension means, such as a wheel providing friction to said tape. The tape forms a loop within the interior of the wall. Once the subject wiring is positioned within the loop of the tape, the tape is retracted thus capturing the subject wiring. The guide arm is removed from the opening thus removing the subject wiring at the same time.

The primary object of the present invention is to provide an apparatus in which wiring can be removed from within a wall or other closed space in an efficient and effective manner.

Other objects will appear from time to time in the ensuing specifications and drawings.

DESCRIPTION OF THE PREFERRED EMBODIMENT

Figure 1:
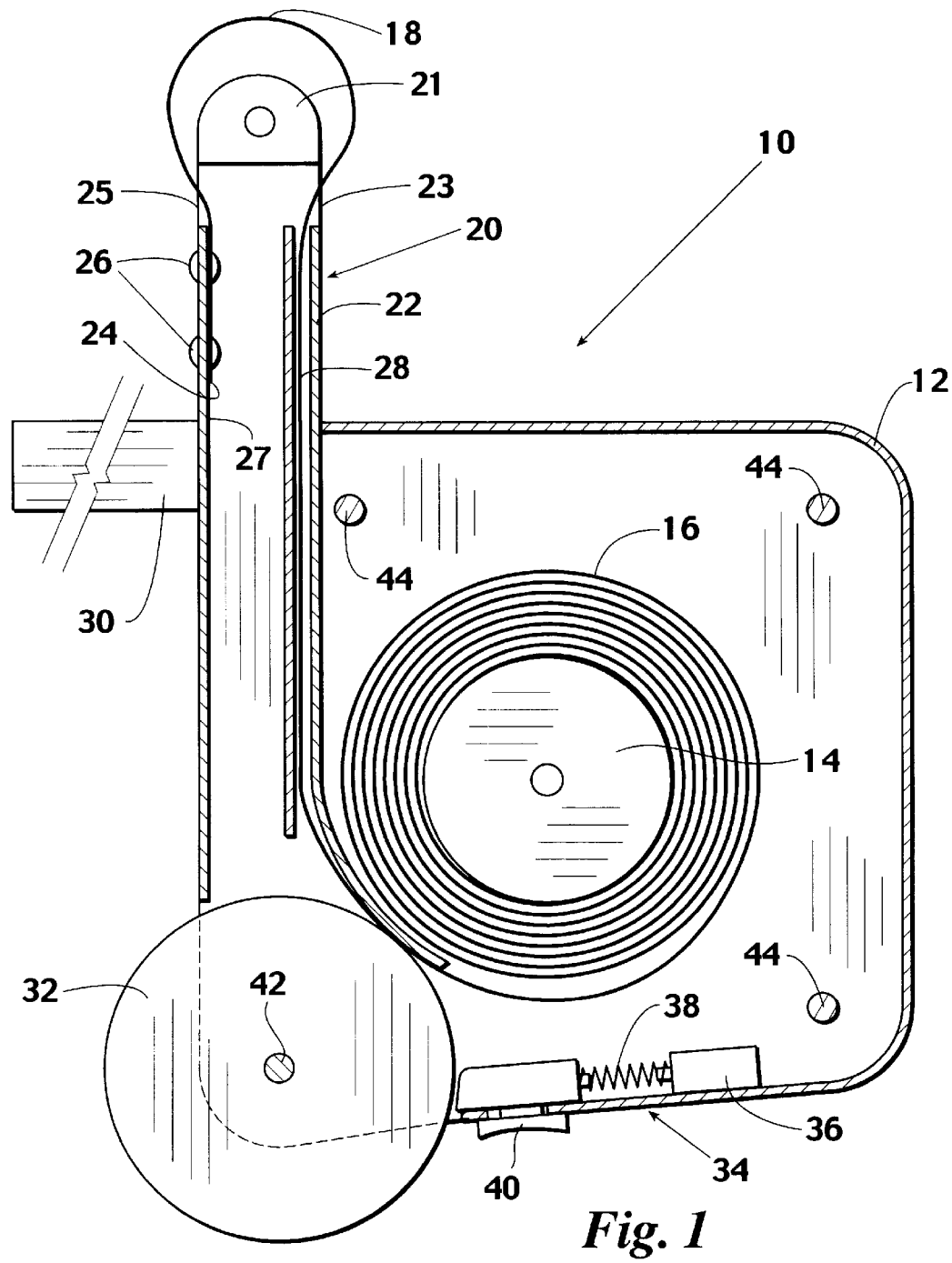
FIG. 1 is a cross-sectional view of the present invention along line AA.

Referring to FIGS. 1–4, the present invention related to a retractable tape 10 which comprises a housing 12 and a tape 16. Housing 12 comprises a coiled spring 14, a guide arm 20 and a stablizer 30. During times of non-use , tape 16 is wrapped around coiled spring 14. In general, guide arm 20 is placed within an opening 54 in a wall 50, such as an electrical outlet opening. Tape 16 is extended from housing 12 inside the wall 50 through guide arm 20. Tape 16 forms a loop 18 within the interior 58 of wall 50. Once the subject wire 56 is positioned within loop 18, tape 16 is retracted back within housing 12. Wire 56 is captured within the inside of loop 18. Guide arm 20, along with wire 56, are removed from the opening 54. Stablizer 30 is used to assist in handling housing 12 during use.

Figure 2:
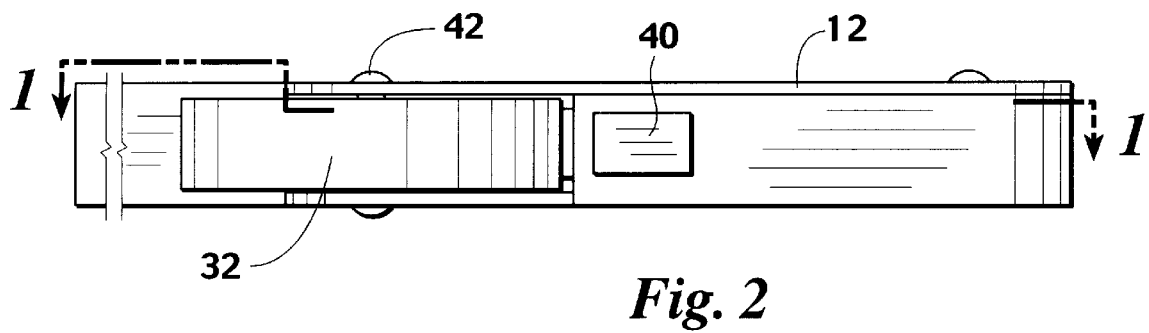
FIG. 2 is a top view of the present invention.
Figure 3:
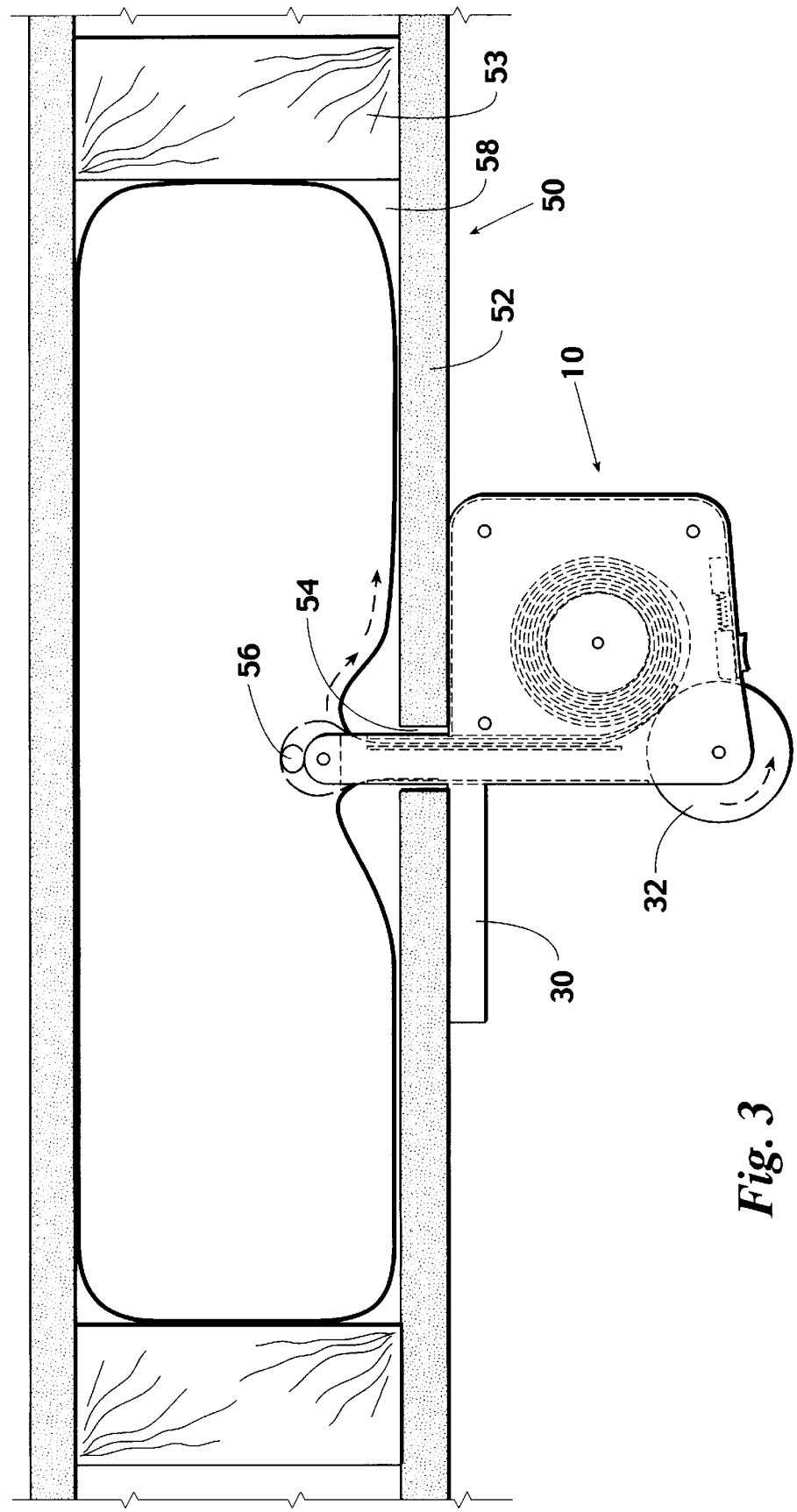
FIG. 3 is a perspective view of the present invention in an extended mode.
Figure 4:
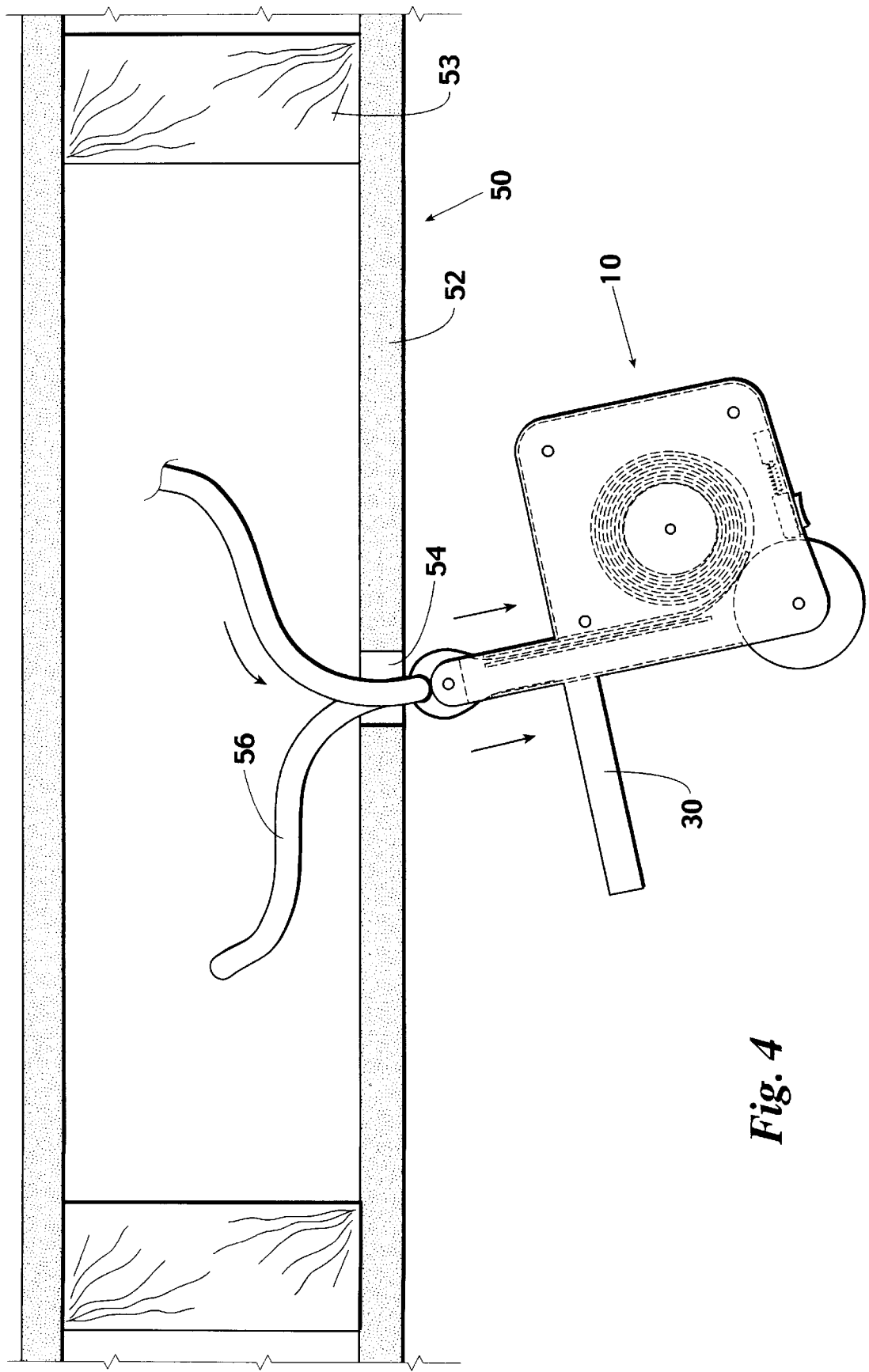
FIG. 4 is a perspective view of the present invention after capture of a wire from within a wall or other confined space.

Details of housing 12 are shown in FIGS. 1 and 2. FIG. 1 shows tape 16 wrapped around a coiled spring apparatus 14. Tape 16 runs from the coiled spring apparatus 14 through the guide path 28 out anterior opening 23 around tip 21 in posterior opening 25 and is secured to the interior wall 27 of posterior side 24 by securing means 26.

Tape 16 is extended by means of wheel 32 applying force in the form of friction to tape 16 in such a manner as to move tape 16 along guide path 28. Wheel 32 rotates around pivot rod 42. To prevent tape 16 from retracting prematurely, spring-loaded lock assembly 34 is in contact with wheel 32. Spring-loaded lock assembly 34 comprises a base 36, a spring 38 and a lock portion 40, with lock portion 40 being the part of the assembly which is in actual contact with wheel 32. Lock portion 40 is removed from contact when tape 16 is to be retracted.

Variations of the present invention described herein will occur to those skilled in the art within the scope and spirit of the present invention, and will be within the protection afforded by the following claims.

What is claimed is:

1. A retractable tape for securing wire or cable from inside a wall or other confined space comprising:

a housing and a coiled tape adapted to be inserted through an opening in a wall or other confined space in order to capture a wire or cable as the wire or cable is being fed within the wall or other confined space;

said housing having a first interior, comprising,
a retracting means located within the first interior,
a stabilizer,
a guide arm having a second interior,
extension means for extending the coiled tape, wherein the extension means comprises a wheel providing friction to the tape in order to extend the tape from the housing, said coiled tape being mounted within the housing and adapted to extend therefrom, having a first end, secured by securing means to the guide arm, a second end, secured by securing means to said retracting means of the housing, and a body which when extended forms a loop.

2. The retractable tape as in claim 1 wherein the retaining means is a spring-loaded lock assembly.

3. The retractable tape as in claim 2 wherein the retaining means is further characterised by being in communication with said extension means in order to prevent the coiled tape when extended from retracting.

4. The retractable tape as in claim 1 wherein the guide arm further comprises:

a posterior side having an exterior wall and an interior wall and a first opening, an anterior side having an exterior wall and an interior wall and a second opening, and an end.

5. The retractable tape as in claim 4 wherein the end is a rounded tip.

6. A retractable tape as in claim 4 characterized in that the first end of the coiled tape is secured by securing means to the interior wall of the posterior side of the guide arm, and the body of the coiled tape proximate to the first end passes through the first opening of the guide arm, around the end of the guide arm and through the second opening of the guide arm so that the body of the coiled tape is located within the interior of the housing.

7. A retractable tape for securing wire or cable from inside a wall or other confined space comprising:

a housing and a coiled tape adapted to be inserted within an opening in a wall or other confined space in order to snag a wire or cable as the wire or cable is being fed through the wall or other confined space;

said housing, having a first interior, comprising, a retracting means located within the first interior, a stabilizer, a guide arm, having a second interior, further comprising, a posterior side having an exterior wall and an interior wall and a first opening, an anterior side having an exterior wall and an interior wall and a second opening, and an end, extension means for extending the coiled tape, and retaining means for preventing the coiled tape when extended from retracting;

said coiled tape mounted within the housing and adapted to extend therefrom, having a first end, secured by securing means to the interior wall of the posterior side of the guide arm, a second end, secured by securing means to the retracting means of the housing, and a body, wherein the portion proximate to the first end passes through the first opening of the guide arm, around the end of the guide arm and through the second opening of the guide arm so that the body of the coiled tape is located within the interior of the housing, and when extended forms a loop.

8. The retractable tape as in claim 7 wherein the end is a rounded tip.

9. The retractable tape as in claim 7 wherein the extension means is a wheel providing friction to the tape in order to extend the tape therefrom.

10. The retractable tape as in claim 7 wherein the retaining means is a spring-loaded lock assembly.

11. The retractable tape as in claim 10 wherein the retaining means is further characterised by being in communication with said extension means in order to prevent the coiled tape when extended from retracting.

12. An retractable tape for securing wire or cable from inside a wall or other confined space comprising:

a housing and a coiled tape adapted to be inserted within an opening in a wall or other confined space in order to snag a wire or cable as the wire or cable is being fed through the wall or other confined space;

said housing, having a first interior, comprising, a retracting means located within the first interior, a stabilizer, a guide arm, having a second interior, further comprising, a posterior side having an exterior wall and an interior wall and a first opening, an anterior side having an exterior wall and an interior wall and a second opening, and an end, a wheel providing friction to the tape in order to extend the tape therefrom, and a spring-loaded lock assembly being in communication with said wheel in order to prevent the coiled tape when extended from retracting;

said coiled tape mounted within the housing and adapted to extend therefrom, having a first end, secured by securing means to the interior wall of the posterior side of the guide arm, a second end, secured by securing means to the retracting means of the housing, and a body, wherein the portion proximate to the first end passes through the first opening of the guide arm, around the end of the guide arm and through the second opening of the guide arm so that the body of the coiled tape is located within the interior of the housing, and when extended forms a loop.

\* \* \* \* \*